(12) United States Patent
Poulad et al.

(10) Patent No.: US 11,809,020 B2
(45) Date of Patent: Nov. 7, 2023

(54) LOCATING ELECTRICAL CONTACTS ON DEVICE HINGE

(71) Applicant: Microsoft Technology Licensing, LLC, Redmond, WA (US)

(72) Inventors: Navid Poulad, San Jose, CA (US); Young duk Song, Bellevue, WA (US); Paul Andrew Bosveld, Seattle, WA (US); Nicolas A Denhez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 17/241,612

(22) Filed: Apr. 27, 2021

(65) Prior Publication Data

US 2022/0342237 A1 Oct. 27, 2022

(51) Int. Cl.
| | |
|---|---|
| *G02C 11/00* | (2006.01) |
| *A45C 11/04* | (2006.01) |
| *A45C 15/00* | (2006.01) |
| *G02C 5/22* | (2006.01) |
| *H02J 7/00* | (2006.01) |

(52) U.S. Cl.
CPC ............. *G02C 11/10* (2013.01); *A45C 11/04* (2013.01); *A45C 15/00* (2013.01); *G02C 5/22* (2013.01); *H02J 7/0045* (2013.01)

(58) Field of Classification Search
CPC ......... A45C 15/00; A45C 11/04; A45C 11/00; G02C 5/22; G02C 11/10; G02C 11/00; H02J 7/0045

USPC .......................................................... 351/140
See application file for complete search history.

(56) References Cited

U.S. PATENT DOCUMENTS

| | | | |
|---|---|---|---|
| 9,726,904 B1 | 8/2017 | Lin | |
| 10,218,114 B2 | 2/2019 | Tham et al. | |
| 11,137,621 B1* | 10/2021 | Castaneda | A45C 11/04 |
| 11,163,161 B2* | 11/2021 | Woodman | G02B 27/017 |
| 2008/0129953 A1* | 6/2008 | Blum | G02C 11/10 351/158 |
| 2016/0246059 A1* | 8/2016 | Halpin | G02B 27/0176 |
| 2018/0102606 A1* | 4/2018 | Tham | H02J 7/0068 |
| 2019/0369402 A1 | 12/2019 | Woodman et al. | |
| 2020/0350728 A1* | 11/2020 | Patton | H01R 13/6205 |

OTHER PUBLICATIONS

"International Search Report and Written Opinion Issued in PCT Application No. PCT/US22/023212", dated Jul. 20, 2022, 10 Pages.

\* cited by examiner

*Primary Examiner* — William R Alexander
(74) *Attorney, Agent, or Firm* — Alleman Hall Creasman & Tuttle LLP

(57) ABSTRACT

Examples are disclosed that relate to arranging electrical contacts on a hinge of a wearable device. One example provides a wearable device comprising a frame, a first temple piece, a second temple piece, a first hinge connecting the first temple piece to the frame, a second hinge connecting the second temple piece to the frame, and a first contact and a second contact arranged on one or more of the first hinge and the second hinge, the first contact and the second contact being configured to connect with external circuitry.

18 Claims, 7 Drawing Sheets

LOCATING ELECTRICAL CONTACTS ON DEVICE HINGE

BACKGROUND

Portable electronic devices commonly have rechargeable batteries, as well as computing functionalities that can involve data exchange with external devices. As such, electronic devices often have an electrical interface, such as a Universal Serial Bus (USB) connector, for battery charging and data transfer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to arranging electrical contacts on a hinge of a wearable device. One example provides a wearable device comprising a frame, a first temple piece, a second temple piece, a first hinge connecting the first temple piece to the frame, a second hinge connecting the second temple piece to the frame, and a first contact and a second contact arranged on one or more of the first hinge and the second hinge, the first contact and the second contact being configured to connect with external circuitry.

DETAILED DESCRIPTION

As mentioned above, a wide variety of devices can be configured with an electrical interface for battery charging and/or data transfer. Many devices have a plug receptacle, such as for a USB cable. However, such a receptacle can be relatively large, and thus impact a device design. Further, such receptacles may be prone to wear and contamination. Some electrical interfaces for cables may utilize a magnet to maintain an integrity of an electrical connection for power and data transmission. However, such magnets may interfere with device components on the wearable device, such as an inertial measurement unit (IMU).

Some electronic devices avoid the use of such a receptacle by utilizing electrical contacts located on a body of the device, wherein the contacts are positioned to interface with complementary contacts on a complementary device (e.g. a carrying case). For example, some earbud devices include contacts arranged on an exterior of a stem portion of the earbud device, wherein the contacts are configured to be positioned against complementary contacts in a carrying/charging case. However, as with a USB cable interface, such contacts can impact industrial design. Furthermore, the contacts may be located on the device at a place that is often touched by a user, which can expose the contacts to contaminants and damage.

In view of the above, examples are disclosed that relate to, on a wearable device, positioning electrical contacts for connecting to external circuitry on a hinge of the device so that the contacts are hidden from a design standpoint. As described in more detail below, the contacts can be arranged on a top and bottom side of a hinge (with reference to an orientation of the device while worn on a head of a person in an upright position), or on a hinge cover that is exposed when the temple pieces are folded in a closed configuration of the device. The disclosed contact placements help to conceal the contacts for a more pleasing industrial design, yet are positioned to interface with external circuitry when placed in a corresponding device case for charging and/or data transfer. Further, an electrical connection of the contacts to the external circuitry when the wearable device is placed in the corresponding device case may be maintained without the aid of magnets.

Figure 1:
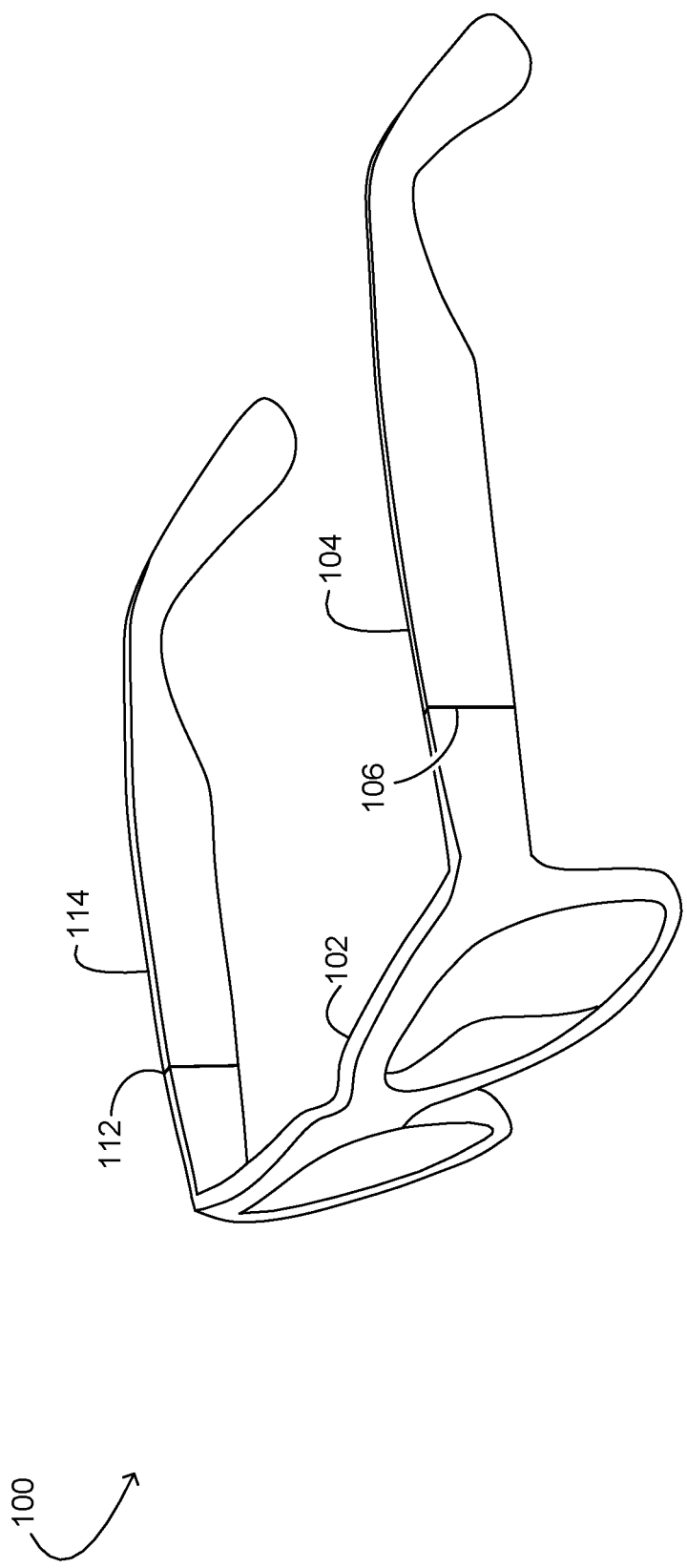
FIG. 1 shows an example wearable device.

FIG. 1 shows an example wearable device 100 having a form factor similar to a pair of glasses. Wearable device 100 can be a mixed reality display device or other suitable type of display device. Further, in some examples the wearable device may be configured as an audio output device without a display component. Wearable device 100 comprises a frame 102, a first temple piece 104, and a second temple piece 114. The first temple piece 104 is connected to the frame 102 via a first hinge 106, and the second temple piece 114 is connected to the frame 102 via a second hinge 112. Wearable device 100 further comprises various circuit components contained within the frame 102, the first temple piece 104, and/or the second temple piece 114, examples of which are described below.

Figure 2:
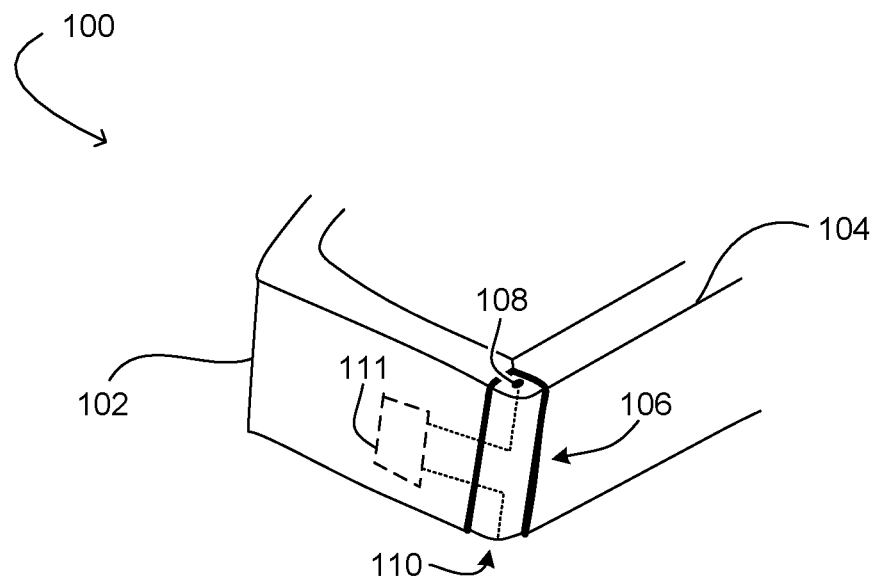
FIG. 2 shows a hinge portion of the wearable device of FIG. 1, and illustrates electrical contacts on a top side and a bottom side of a hinge.

FIG. 2 shows a close-up view of a hinge portion of the wearable display device 100, and illustrates a first contact 108 arranged on a top side of the hinge 106 and a second contact 110 arranged on a bottom side of the hinge 106, with reference to an orientation of the wearable display device 100 when worn by a user in an upright position (e.g. standing or sitting). The top side and the bottom side each can be formed from or coated with an electrically conductive material to form the first and second contacts, wherein the electrically conductive coatings connect to circuitry 111 within wearable device 100. In this example, the circuitry is shown as being positioned in frame 102, but can alternatively or additionally be positioned in temple piece 104.

The first contact 108 and the second contact 110 are each configured to connect to external circuitry. The arrangements of the first contact 108 and the second contact 110 respectively on a hinge may provide a visually clean appearance, and can offer possible protection of the first and second contacts from environmental and physical wear, such as abrasion or oil from a user's fingers, compared to locations more likely to be grasped by a user. While FIG. 2 shows both the first contact 108 and the second contact 110 arranged on a first hinge 106, other examples may have the first contact and the second contact distributed between the first hinge and a second hinge.

In some examples the first contact 108 and the second contact 110 can be configured to transfer electrical power, such as for charging a battery. Further, in some examples the first and second contacts alternatively or additionally can be configured to transfer data, such as a low-bandwidth data transfer over power lines. In yet other examples, the wearable device 100 may further comprise a third contact and a fourth contact similarly configured and arranged as the first contact and the second contract, but on a second hinge. In such examples, the first, second, third, and fourth contacts may enable USB communication, such as USB2 or other suitable USB formats. USB communication may facilitate loading an operating system, reset and recovery efforts, and debug and troubleshooting efforts of the wearable device 100.

Figure 3A:
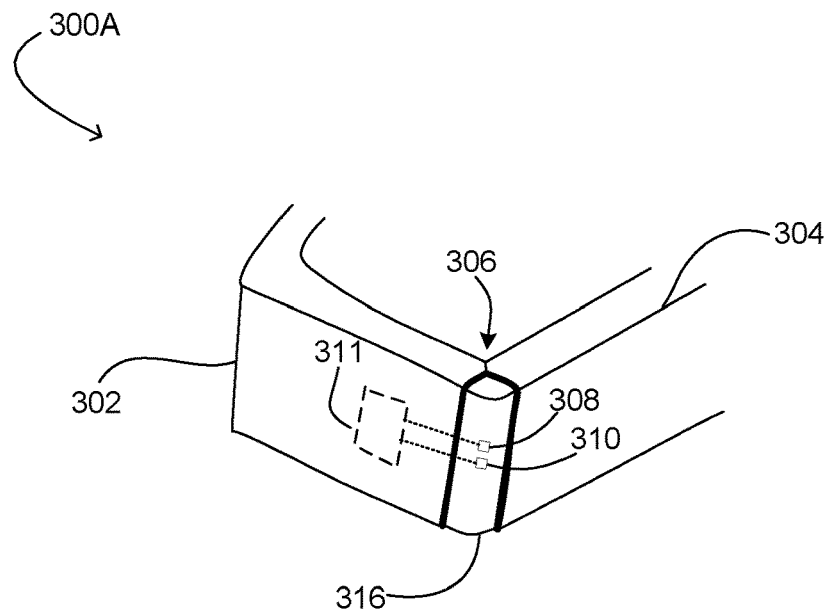
FIGS. 3A & 3B shows another example wearable device comprising a hinge and a hinge cover with electrical contacts, and respectively illustrate the wearable device in a closed configuration and an open configuration.
Figure 3B:
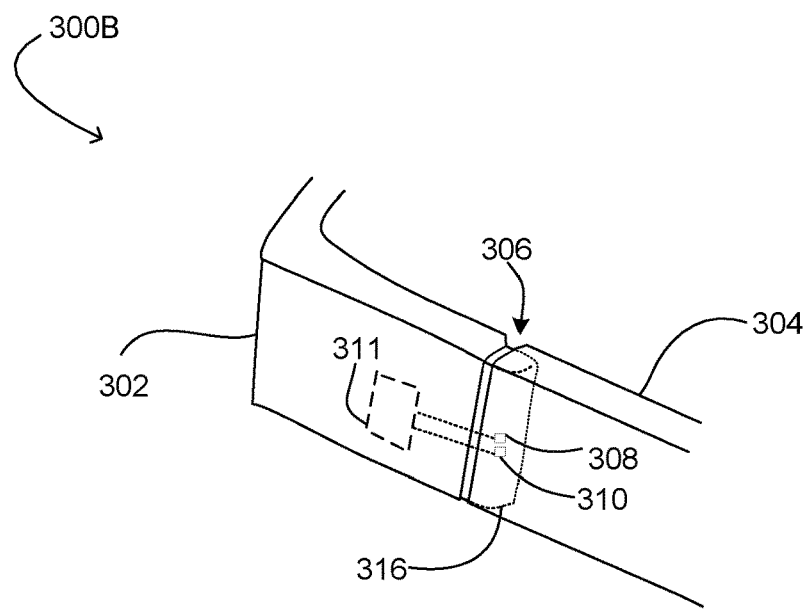

FIGS. 3A and 3B show another example wearable device 300 having a different arrangement of contacts. Similar to the wearable device 100, the wearable device 300 comprises a frame 302, a temple piece 304 connected to the frame 302 via a hinge 306, a first contact 308 arranged on a hinge, and a second contact 310 arranged on the hinge. However, instead of being arranged on a top side and a bottom side of a hinge, the first contact 308 and the second contact 310 are arranged on a hinge cover 316. The hinge cover 316 is configured to cover interior structures of the hinge 306 when the wearable device 300 is in a closed configuration, as shown in FIG. 3A, and to be substantially concealed by one or more of the temple piece 304 and the frame 302 when the wearable device is in an open configuration, as shown in FIG. 3B. The first and second contacts are connected to circuitry 311 within wearable device 300. In this example, the circuitry is shown as being positioned in frame 302, but can alternatively or additionally be positioned in temple piece 304. In other examples, the first and second contact may be arranged on the hinge cover 316 such that the first contact 308 and the second contact 310 are accessible through a cosmetic gap between the temple piece 304 and the frame 302 when the wearable device 300 is in the open configuration. In such examples, the cosmetic gap may allow in-use debugging of the wearable device 300. Further, in some examples, the wearable device 300 may further comprise a second hinge on which one or more contacts are located (e.g. a third contact and a fourth contact).

Figure 4:
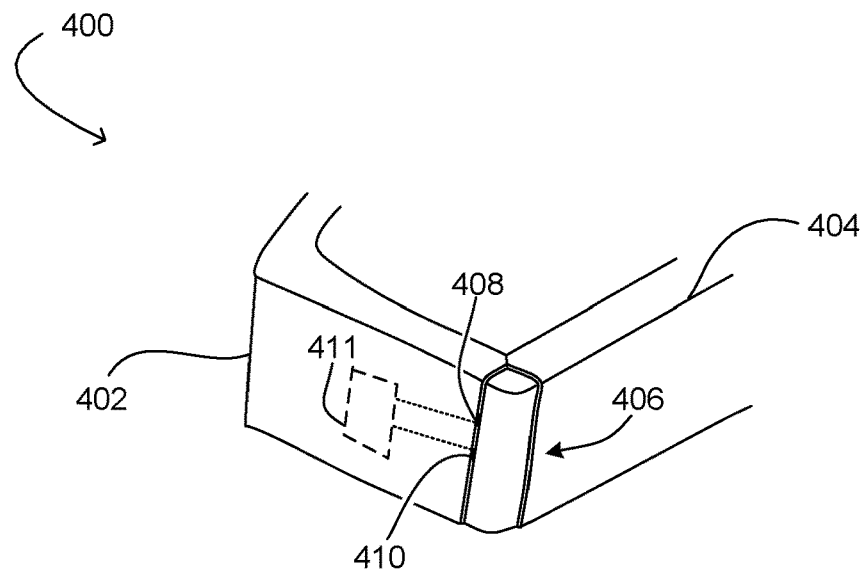
FIG. 4 shows an example wearable device comprising a hinge with electrical contacts at an edge of a frame.
Figure 5:
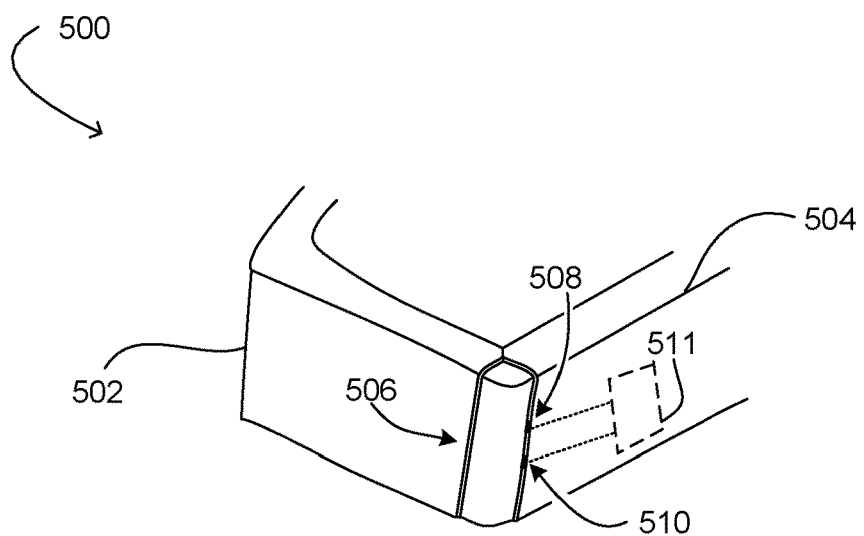
FIG. 5 shows an example wearable device comprising a hinge with electrical contacts at an edge of a temple piece.

FIG. 4 and FIG. 5 show further wearable devices that illustrate other examples of arrangements of first and second contacts on device hinges. First referring to FIG. 4, the illustrated wearable device 400 comprises a frame 402 and a temple piece 404 connected via a hinge 406, a first contact 408, and a second contact 410, similar to wearable devices 100 and 300. However, the first contact 408 and the second contact 410 of the wearable device 400 are arranged on an edge of the frame 402 at hinge 406. The first and second contacts are connected to circuitry 411 within wearable device 400. In this example, the circuitry is shown as being positioned in frame 402, but may alternatively or additionally be positioned in temple piece 404. Next referring to FIG. 5, the depicted wearable device 500 comprises a first contact 508 and a second contact 510 arranged on an edge of a temple piece 504 at hinge 506 of wearable device 500. The first and second contacts are connected to circuitry 511 within wearable device 500. In this example, the circuitry is shown as being positioned in temple piece 504, but alternatively or additionally may be positioned in frame 502. In other examples, a wearable device can include any suitable number of contacts arranged in any suitable combination of locations on one or more device hinges, including but not limited to any of the locations described above.

Figure 6:
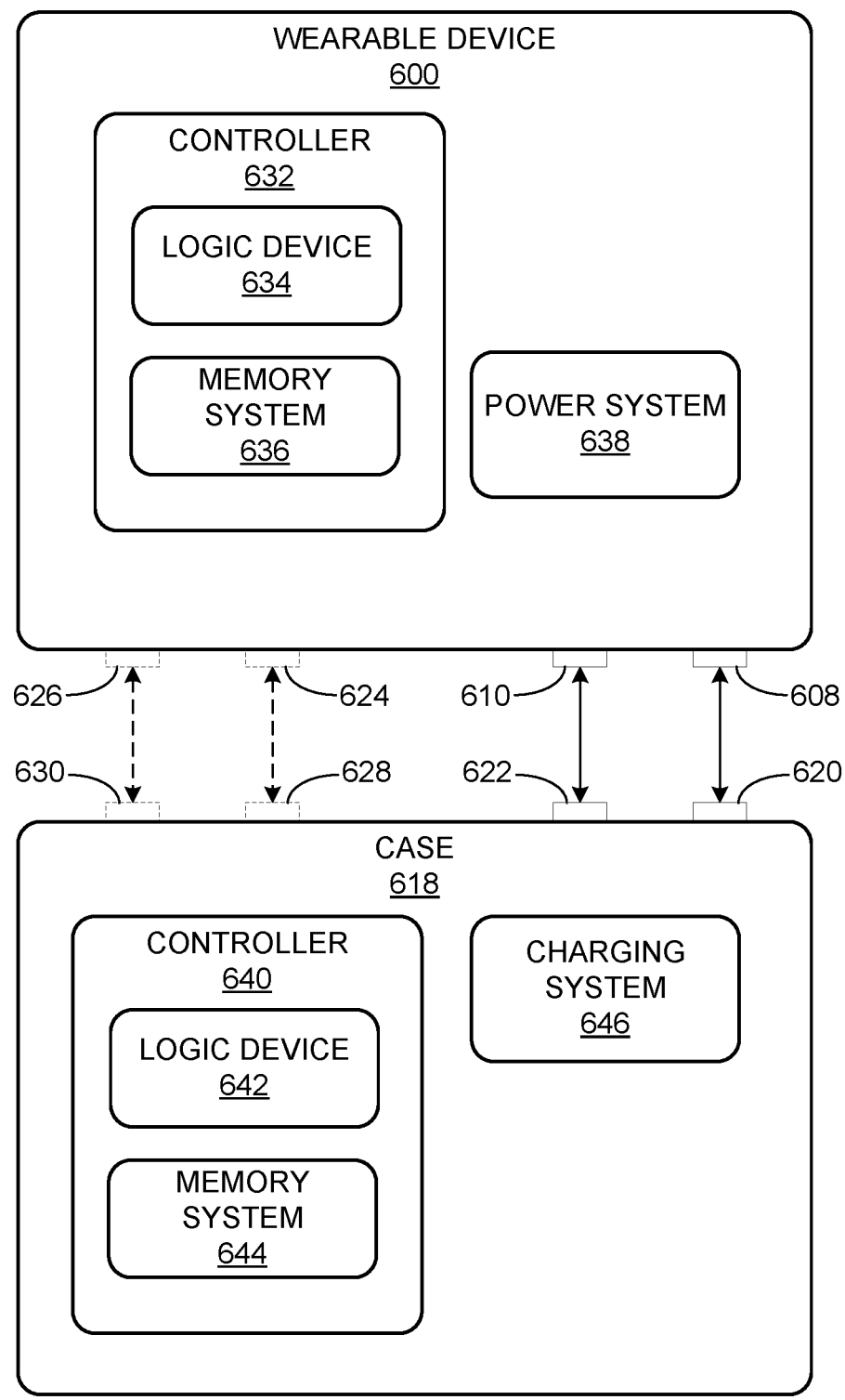
FIG. 6 shows a block diagram illustrating example circuitry on a wearable device and on a case for the wearable device.

As previously mentioned, an electrical contact located on a hinge of a wearable device can be configured to connect to external circuitry. One example of external circuitry is circuitry contained within a storage and/or carrying case. FIG. 6 shows a schematic depiction of an example wearable device 600 positioned within an example case 618. As with wearable device 100, wearable device 600 comprises a first contact 608 and a second contact 610, and may optionally comprise one or more additional contacts (two of which are shown here as third contact 624 and fourth contact 626). The case 618 comprises a first case contact 620 and a second case contact 622 and further optionally comprises a third case contact 628 and a fourth case contact, wherein the first, second, third, and fourth case contacts are each positioned to interface with the respective first, second, third, and fourth contacts on the wearable device when the wearable device 600 is positioned in the case 618. Each connection between corresponding contacts can be configured to transfer electrical power and/or data between the wearable device 600 and the case 618. In the examples comprising four contacts and four case contacts, the first, second, third, and fourth contacts and the first, second, third, and fourth case contacts may further be configured to enable USB communication between the wearable device 600 and the case 618. Examples of circuitry on the wearable device 600 include a controller 632 comprising a logic device 634 and a memory system 636, and a power system 638. Examples of external circuitry to which the controller 632 and the power system 638 may connect include a case controller 640 comprising a logic device 642 and memory system 644, and/or a charging system 646. Example controller hardware implementations are described in more detail below with reference to FIG. 9.

Figure 7:
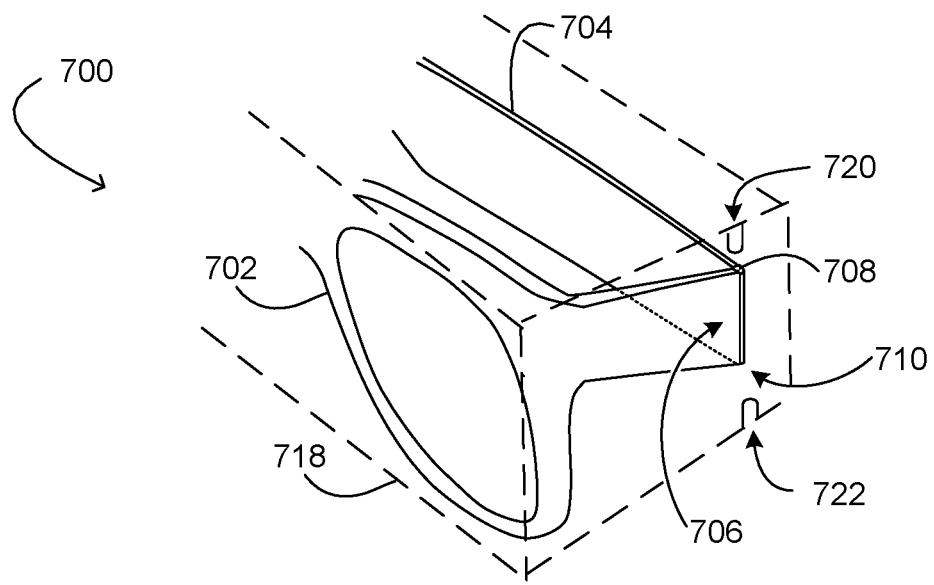
FIG. 7 schematically shows the wearable device of FIG. 2 positioned in an example case.

A wearable device and device case may have any suitable configurations that bring device contacts and case contacts into electrical connection when the wearable device is positioned in the case. FIG. 7 shows one example of case contacts positioned in a case to automatically connect to contacts on a wearable device positioned in the case. Similar to wearable device 100, wearable device 700 comprises a first contact 708 arranged on a top side of a hinge 706 and a second contact 710 arranged on a bottom side of the hinge 706. Further, case 718 comprises a first case contact 720 and a second case contact 722 positioned respectively adjacent to first contact 708 and second contact 710 to make electrical contact between corresponding contacts when the wearable device is positioned within the case.

Various mechanisms can be used to help ensure that electrical connections between case contacts and device contacts remains electrically robust. For example, first case contact 720 and second case contact 722 each may comprise or otherwise be coupled to a mechanical spring, such as in the form of a leaf spring or pogo pin, to push the respective case contact against the corresponding device contact. Where the first and second case contacts each is configured to exert spring force against a corresponding contact, the arrangement of the first contact 708 on the top side of the hinge 706 and the second contact 710 on the bottom side of the hinge 706 may exert little to no net spring force on the hinge 706.

Figure 8:
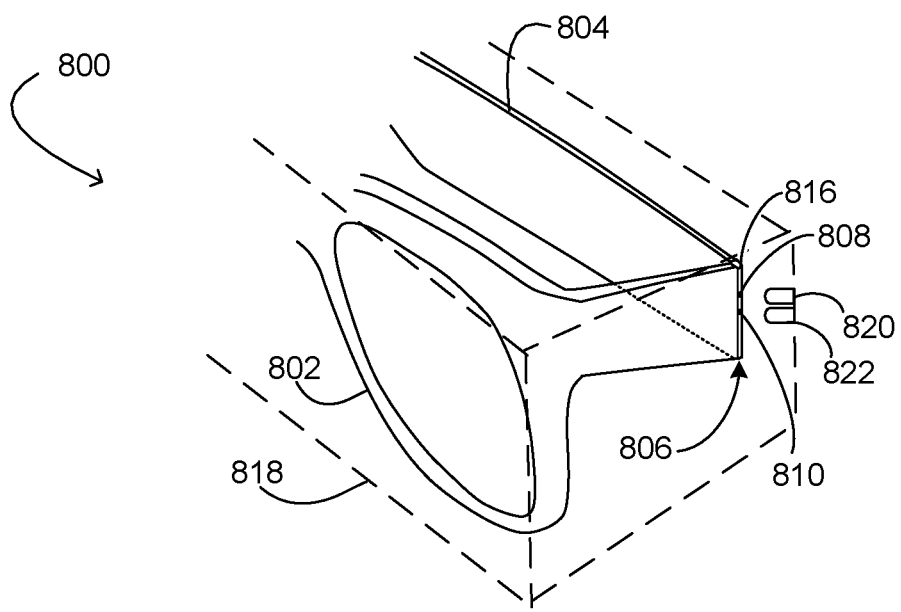
FIG. 8 schematically shows the wearable device of FIG. 3 positioned in an example case.

FIG. 8 shows another example case configured such that electrical contacts on a wearable device and device case are connected when the wearable device is positioned within the case. In this example, wearable device 800 comprises a first contact 808 and a second contact 810 arranged on a hinge cover 816, similar to wearable device 300. Further, case 818 comprises a first case contact 820 and a second case contact 822 in complementary positions to first contact 808 and second contact 810. As described above with regard to FIG. 7, in some examples one or more case contacts each may be held against a corresponding device contact via a spring force, such as provided by a leaf spring or a pogo pin. In examples where the first and second case contacts comprise electrical contacts configured to apply a spring force, case 818 may comprise a molding or other retention mechanism to help hold wearable device 800 in place to maintain an integrity of the electrical connection made between the first and second contacts and the first and second case contacts. Wearable device 800 and case 818 each may further comprise additional contacts, as described above.

The disclosed examples thus can provide a connection to external circuitry with less impact on industrial design and more protection from damage or contamination, compared to plugs or contacts in other locations. Further, the arrangement of the of the contacts and complementary case contacts may provide for a convenient and secure electrical connection without the use of magnets when the wearable device is positioned in a case.

In some examples, the methods and processes described herein may be tied to a computing system of one or more computing devices. In particular, such methods and processes may be implemented as a computer-application program or service, an application-programming interface (API), a library, and/or other computer-program product.

Figure 9:
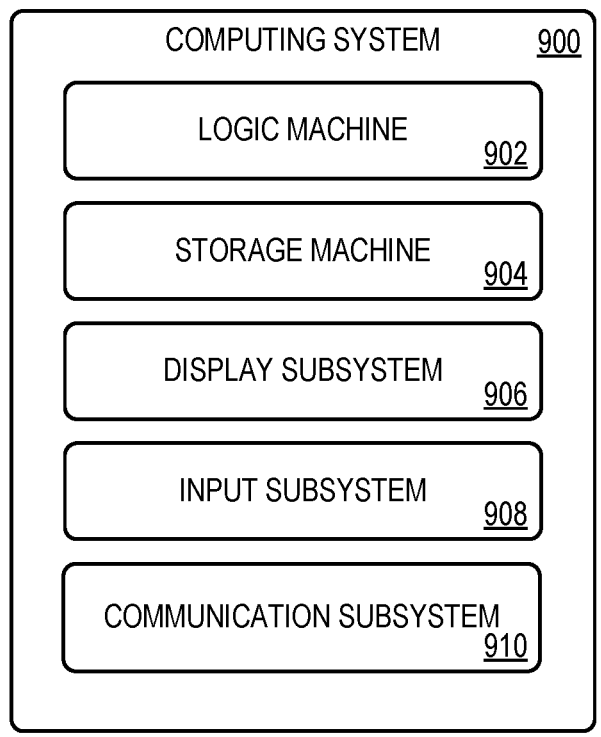
FIG. 9 shows a block diagram depicting an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a wearable device comprising a frame, a first temple piece, a second temple piece, a first hinge connecting the first temple piece to the frame, a second hinge connecting the second temple piece to the frame, and a first contact and a second contact arranged on one or more of the first hinge and the second hinge, the first contact and the second contact being configured to connect with external circuitry. In some examples, alternatively or additionally the device comprises a third contact and a fourth contact configured to connect with the external circuitry and arranged on one or more of the first hinge and the second hinge. In some examples, the first contact is alternatively or additionally on a top side of the first hinge and the second contact is alternatively or additionally on a bottom side of the first hinge. In some examples, alternatively or additionally the device comprises a first hinge cover configured to cover the first hinge when the wearable device is in a closed configuration, and wherein the first contact and the second contact are arranged on the hinge cover. In some examples the first hinge cover is alternately or additionally configured to be substantially concealed by one or more of the first temple piece and the frame when the wearable device is in an open configuration. In some examples, the first contact and the second contact are alternatively or additionally configured to transfer electrical power. In some examples, the first contact and the second contact are alternately or additionally configured to transfer data. In some examples, the device alternatively or additionally comprises a case comprising a first case contact positioned to interface with the first contact of the wearable device and a second case contact positioned to interface with the second contact of the wearable device when the wearable device is positioned in the case, and wherein the external circuitry is contained in the case and is connected to the first case contact and the second case contact.

Another example provides a wearable device comprising a frame, a temple piece, a hinge connecting the first temple piece to the frame, a hinge cover configured to cover a side of the hinge, and an electrical contact configured to connect with external circuitry and arranged on the hinge cover. In some examples, the hinge cover is alternatively or additionally configured to be substantially concealed by one or more of the frame and the temple piece when the wearable device is in an open configuration. In some examples, the electrical contact is alternatively or additionally configured to transfer electrical power. In some examples, the electrical contact is alternatively or additionally configured to transfer data. In some examples, alternatively or additionally the device comprises a case comprising a case contact positioned to interface with the electrical contact of the wearable device when the device is positioned in the case, and wherein the external circuit is contained within the case and is connected to the case contact.

Another example provides a wearable device comprising a frame, a first temple piece, a second temple piece, a first hinge connecting the first temple piece to the frame, a second hinge connecting the second temple piece to the frame, and a first contact and a second contact each configured to connect with external circuitry and each arranged on a top side or a bottom side of the first hinge or the second hinge. In some examples, the first contact and the second are alternatively or additionally configured to transfer electrical power. In some examples, the first contact and the second contact are alternately or additionally configured to transfer data. In some examples, alternatively or additionally the device comprises a case comprising a first case contact positioned to interface with the first contact of the wearable device and a second case contact positioned to interface with the second contact of the wearable device when the wearable device is positioned in the case, and wherein the external circuitry is contained within the case and is connected to the first case contact and the second case contact. In some examples, the first and the second case contacts alternatively or additionally comprise pogo-pins. In some examples, the device alternatively or additionally comprises a third contact and a fourth contact configured to connect with external circuitry and arranged on one or more of the first hinge and the second hinge. In some examples, the first, the second, the third, and the fourth contacts are alternately or additionally configured for USB communication.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable device comprising:
a frame;
a first temple piece;
a second temple piece;
a first hinge connecting the first temple piece to the frame;
a second hinge connecting the second temple piece to the frame; and
a first contact arranged on a top side of the first hinge and a second contact arranged on a bottom side of the first hinge, the first contact and the second contact being configured to connect with external circuitry.

2. The device of claim 1, further comprising a third contact and a fourth contact configured to connect with the external circuitry and arranged on one or more of the first hinge and the second hinge.

3. The device of claim 1, further comprising a first hinge cover configured to cover the first hinge when the wearable device is in a closed configuration, and wherein the first contact and the second contact are arranged on the hinge cover.

4. The device of claim 3, wherein the first hinge cover is configured to be substantially concealed by one or more of the first temple piece and the frame when the wearable device is in an open configuration.

5. The device of claim 1, wherein the first contact and the second contact are configured to transfer electrical power.

6. The device of claim 1, wherein the first contact and the second contact are configured to transfer data.

7. The device of claim 1, further comprising
a case comprising a first case contact positioned to interface with the first contact of the wearable device and a second case contact positioned to interface with the second contact of the wearable device when the wearable device is positioned in the case, and wherein the external circuitry is contained in the case and is connected to the first case contact and the second case contact.

8. A wearable device comprising:

a frame;

a temple piece;

a hinge connecting the temple piece to the frame;

a hinge cover configured to cover a side of the hinge, the hinge cover configured to be substantially concealed by one or more of the frame or the temple piece when the wearable device is in an open configuration; and an electrical contact configured to connect with external circuitry and arranged on the hinge cover.

9. The device of claim 8, wherein the electrical contact is configured to transfer electrical power.

10. The device of claim 8, wherein the electrical contact is configured to transfer data.

11. The device of claim 8, further comprising a case comprising a case contact positioned to interface with the electrical contact of the wearable device when the device is positioned in the case, and wherein the external circuit is contained within the case and is connected to the case contact.

12. A wearable device comprising:

a frame;

a first temple piece;

a second temple piece;

a first hinge connecting the first temple piece to the frame;

a second hinge connecting the second temple piece to the frame; and a first contact and a second contact each configured to connect with external circuitry and each arranged on a top side or a bottom side of the first hinge or the second hinge.

13. The device of claim 12, wherein the first contact and the second contact are configured to transfer electrical power.

14. The device of claim 12, where the first contact and the second contact are configured to transfer data.

15. The device of claim 12, further comprising a case comprising a first case contact positioned to interface with the first contact of the wearable device and a second case contact positioned to interface with the second contact of the wearable device when the wearable device is positioned in the case, and wherein the external circuitry is contained within the case and is connected to the first case contact and the second case contact.

16. The device of claim 15, wherein the first and the second case contacts comprise pogo-pins.

17. The device of claim 12, further comprising a third contact and a fourth contact configured to connect with external circuitry and arranged on one or more of the first hinge and the second hinge.

18. The device of claim 17, wherein the first, the second, the third, and the fourth contacts are configured for USB communication.

* * * * *